(12) United States Patent
Rinke et al.

(10) Patent No.: US 9,454,590 B2
(45) Date of Patent: Sep. 27, 2016

(54) PREDICTING VALIDITY OF DATA REPLICATION PRIOR TO ACTUAL REPLICATION IN A TRANSACTION PROCESSING SYSTEM

(71) Applicant: International Business Machines Corporation, Armonk, NY (US)

(72) Inventors: Ralph A. Rinke, Grafton, WI (US); Clark W. Walker, Erie, PA (US); Austin J. Willoughby, Voorheesville, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/165,697

(22) Filed: Jan. 28, 2014

(65) Prior Publication Data
US 2015/0213099 A1 Jul. 30, 2015

(51) Int. Cl.
*G06F 17/30* (2006.01)
(52) U.S. Cl.
CPC ... *G06F 17/30575* (2013.01); *G06F 17/30371* (2013.01)
(58) Field of Classification Search
None
See application file for complete search history.

(56) References Cited

U.S. PATENT DOCUMENTS

| 5,530,855 | A | 6/1996 | Satoh et al. |
| 6,879,986 | B1 | 4/2005 | Fisher |
| 7,289,964 | B1* | 10/2007 | Bowman-Amuah ............... G06F 9/5038 705/1.1 |
| 7,650,354 | B2 | 1/2010 | Takahashi |
| 2003/0014585 | A1* | 1/2003 | Ji ......................... G06F 3/0601 711/112 |
| 2004/0111390 | A1* | 6/2004 | Saito .................. G06F 11/1435 |
| 2004/0220974 | A1 | 11/2004 | Cressman |
| 2009/0319525 | A1* | 12/2009 | Thiel ................... G06F 11/0751 |
| 2010/0146188 | A1* | 6/2010 | Bramante .......... G06F 11/1435 711/103 |
| 2012/0066183 | A1* | 3/2012 | Adkins ............ G06F 17/30088 707/649 |

OTHER PUBLICATIONS

Grace Period Disclosure "IBM InfoSphere Data Replication for VSAM for z/OS", Version 11, Release 1, 2013, Guide and Reference, pp. 30-31.
Grace Period Disclosure "IBM InfoSphere classic data replication and federation solutions for z/OS enable near real-time data replication and federation of nonrelational data", IBM United States Software Announcement 213-455, dated Oct. 22, 2013, pp. 1-23.

* cited by examiner

*Primary Examiner* — Sherief Badawi
*Assistant Examiner* — Lahcen Ennaji
(74) *Attorney, Agent, or Firm* — David Zwick; Susan Murray

(57) ABSTRACT

A method, computer program product and computer system to validate a write of a replica record to a replica data store in a transaction processing system, the replica record duplicating a source record in a source data store. The transaction processing system obtains a value associated with a record location of the source record in the source data store. The transaction processing system predicts a value associated with a record location of the replica record in the replica data store and responsive to the obtained value associated with the source record location not corresponding to the predicted value associated with the replica record location, not writing the replica record.

14 Claims, 4 Drawing Sheets

PREDICTING VALIDITY OF DATA REPLICATION PRIOR TO ACTUAL REPLICATION IN A TRANSACTION PROCESSING SYSTEM

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM InfoSphere Data Replication for VSAM for z/OS V11.1.0, made available to the public on Oct. 25, 2013.

BACKGROUND

The present disclosure relates generally to information and data management and more particularly to predicting the validity of data replication, in a transaction processing system, prior to the actual replication.

Data replication is the frequent electronic copying of data records stored on a source data store to a replica data store, either for data recovery or to allow users on multiple computing devices to access data relevant to their tasks without interfering with the work of others. Data replication in a transactional processing system initially replicates an entire data file or database and periodically updates the replica as data records change. In a transaction processing system with replication, it is important to exactly replicate data records from the source data store to the replica data store. For some file types, logical consistency between the source data store and the replica data store constitutes an exact replication. For other file types, such as Virtual Storage Access Method (VSAM) Entry Sequenced Data Set (ESDS), exact replication requires physical consistency, writing the replica record to the same location in the replica data store that the source record is written to in the source data store.

SUMMARY

Embodiments of the present disclosure disclose a method, computer program product, and system for validating a write of a replica record to a replica data store in a transaction processing system, the replica record duplicating a source record in a source data store. The transaction processing system obtains a value associated with a record location of the source record in the source data store. The transaction processing system predicts a value associated with a record location of the replica record in the replica data store and responsive to the obtained value associated with the source record location not corresponding to the predicted value associated with the replica record location, not writing the replica record. In another aspect, responsive to the obtained value associated with the source record location corresponding to the predicted value associated with the replica record location, the transaction processing system writes the replica record to the replica data store. Responsive to the obtained value associated with the source record location not corresponding to an actual value associated with the replica record location in the replica data store, identifying the replica data store as corrupted.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
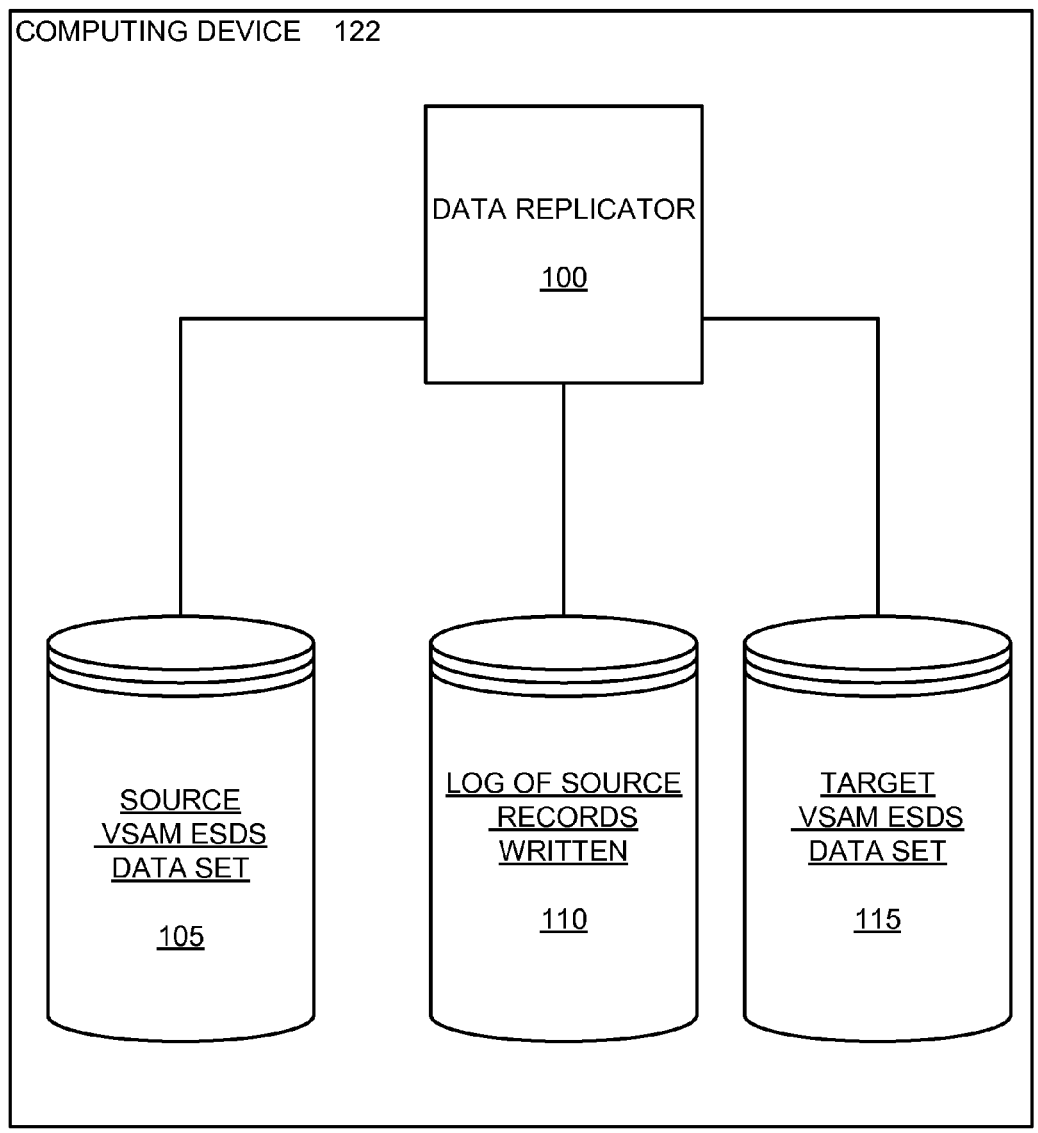
FIG. 1 illustrates a functional block diagram of a VSAM ESDS transaction processing system environment, in accordance with an embodiment of the disclosure.

A transaction processing system may fail for many reasons including system failure, human errors, hardware failure, incorrect or invalid data, computer viruses, software application errors, or natural or man-made disasters. As it's not possible to prevent all transaction processing system failures, a transaction processing system must be able to recover from failures. A transaction processing system may recover from failures by using replicas of source data stores as backup data stores, and transaction log files. Transaction log files, or the log, may include an audit trail of all transactions and data changes. The log may include all essential data for each transaction, including data values, time of transaction, and before and after copies of records that have been modified by transactions. Data values may include the value associated with the record location on the source data store, and a transaction identifier.

For certain file types, the data value may be a logical record location on the source data store, such as an index containing a key that may be used to locate the record within the data store or a record number (slot) used by the access method to locate the record within the data store. For other file types, such as ESDS, the data value may be the relative byte address (RBA) or physical offset of the record within the data set since ESDS does not use a key or slot to locate a record within the data set.

The transaction processing system, in addition to maintaining a replica of changed records, may ensure the replica data store remains synchronized with the source data store, and that the replica data store is not corrupted during replication. Corruption of the replica data store may be defined as a state in which the transaction processing system cannot resolve inconsistencies between a source data store, hereinafter "source data set", and a replica data store, hereinafter "target data set." For example, an RBA inconsistency for any particular record on a VSAM ESDS between the source data set and the target data set may be considered a corruption of the target data set.

In a VSAM ESDS, the RBA represents the key for the record. ESDS records are assigned an RBA when the record is written to the VSAM data set, based on the location written within the ESDS. VSAM ESDS writes records sequentially to the end of the data set and does not allow records to be physically deleted, however, the VSAM ESDS records can be reused when an application flags the record as inactive. The transaction processing system captures changes made to a source VSAM ESDS and replicates the changes to another, similarly defined, target VSAM ESDS. The expectation is that after all changes have been replicated the two VSAM ESDS match exactly, including the RBA values. A corrupt target data set may require external efforts to recover and may require replication to be stopped and restarted.

Transaction processing system recovery may utilize the log to resynchronize the target data set with any data records updated during recovery. Upon the restart of replication, a pointer into the log, or log reading position, indicates the first data record to be replicated. An incorrect log reading position, i.e., pointing to a wrong record in the log to replicate, may corrupt the target data set by causing unexpected log records to be replicated. The unexpected records replicated may be written to the target data set in a record location in the target data set that differs from the record location for the same record in the source data set. For access methods and data set organizations that do not support a physical record delete nor a way to overwrite a record after it is written, for example VSAM ESDS, writing a replica record to a location in the target data set that differs from the source record location recorded in the log for the same record corrupts the target data set. The target data set may also become corrupted when the source and target data sets were unsynchronized at the log reading position specified upon replication start, or when another application writes a record into the target data set.

A corrupt target data set may require the entire source data set to be copied to the target data set, or rebuilt, in order to be recovered. Embodiments of the present disclosure may, advantageously, predict the value associated with the replica record location on the replica data set, or replica record location, prior to the actual write of the replica record, and verify that the replica record will be written to the same record location in the target data set as the source record's location in the source data set. Leveraging that prediction, the transaction processing system may recognize when writing the replica record in the target data set would cause the target data set to become unsynchronized from source data and would corrupt the target data set. Recognizing the mis-match between the predicted replica record location in the target data set and the source record's location in the source data set before writing the replica record may allow the transaction processing system to prevent the replica record from being written to the invalid location in the target data set, thereby preventing the corruption of the target data set. Recognizing the mis-match and preventing the corrupting write to the target data set may also allow the transaction processing system to recover from the mis-match by correcting the log reading position and restarting replication without requiring the target data set to be recovered, and rebuilt. Various embodiments may verify the replica record location both before and after the replica record is written to the target data set. A pre-write check may ensure that the predicted replica record location matches the source record location, recorded in the log, before the replica record is written. A post-write check may ensure that the actual replica record location assigned when the replica record is written still matches the log for the source record. Certain embodiments may generate an error event if the pre-write check determines the record location in the source data set and target data set will not match. Certain embodiments may initiate a replication recovery action for a corrupted target data set when the post-write check recognizes mis-matched record locations after the replica record is written.

Exemplary embodiments of the disclosure will be described using VSAM ESDS, although those of skill in the art will appreciate that other embodiments of the invention may be used to advantage for numerous data set organizations, using various access method services where the data store is dependent on the physical location of the data.

Figure 4:
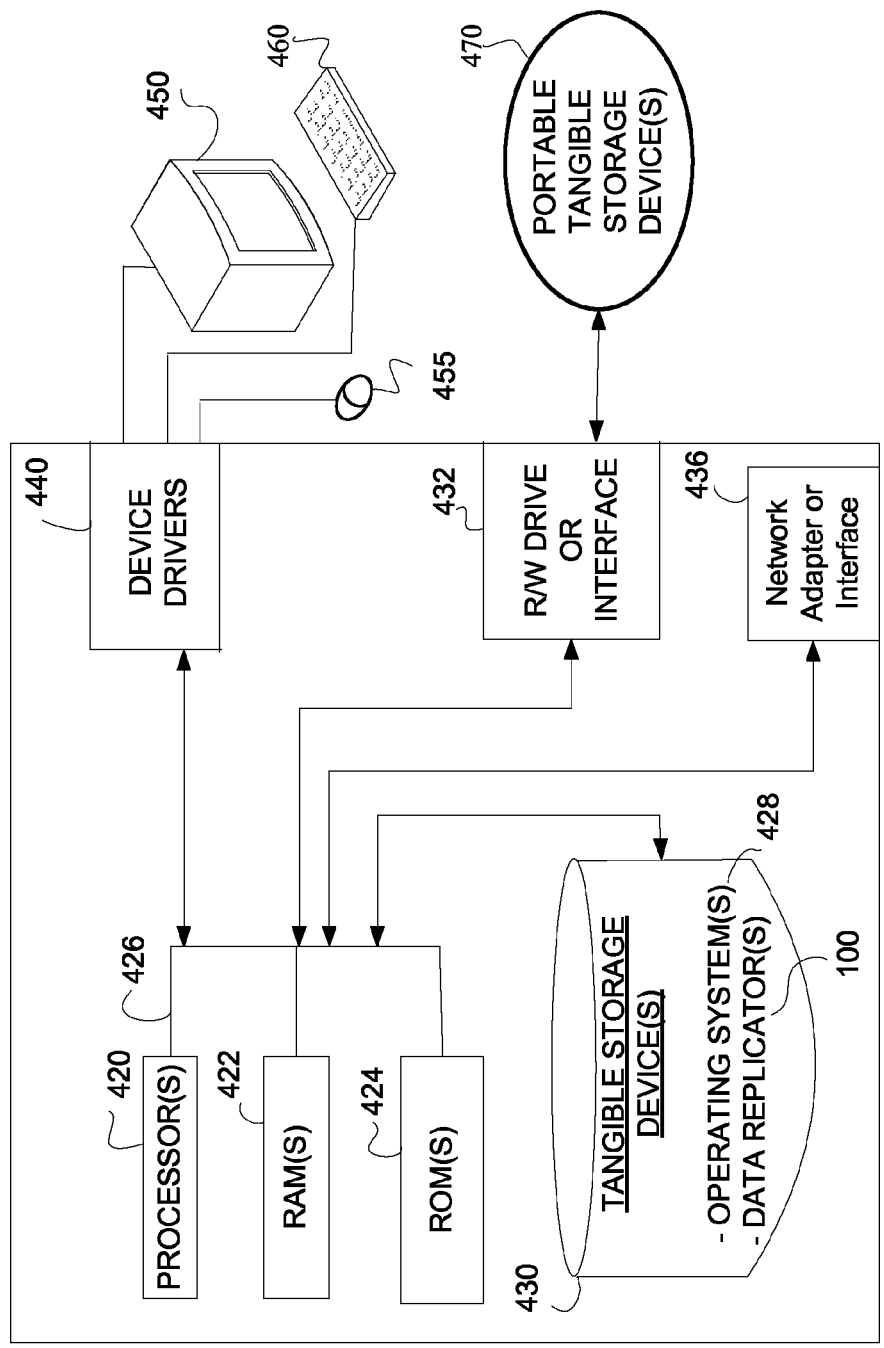
FIG. 4 depicts a block diagram of components of the computing device of a VSAM ESDS transaction processing system environment, in accordance with an embodiment of the disclosure.

FIG. 1 illustrates a functional block diagram of an exemplary VSAM ESDS transaction processing system environment 199, in accordance with an embodiment of the disclosure. The exemplary VSAM ESDS transaction processing system environment 199 includes computing device 122. Computing device 122 represents a computing device, system, or environment that includes data replicator 100, and storage for source data set 105 that is to be replicated, log 110 including, for example, RBA locations for records written to the source data set, and target data set 115 that contains the replica of each record written to source data set 105, all of which may be stored, for example, on a tangible storage device, such as tangible storage device(s) 430 (FIG. 4) or removable tangible storage devices(s) 470 (FIG. 4).

Computing device 122 may be a mainframe computer, a laptop computer, a notebook computer, a personal computer (PC), a desktop computer, a tablet computer, and a thin client. Computing device 122 may include internal and external hardware components, as depicted and described in further detail with respect to FIG. 4. In other various embodiments of the present disclosure, computing device 122 may represent a computing system utilizing clustered computers and components to act as a single pool of seamless resources. In general, computing device 122 is representative of any programmable electronic device or combination of programmable electronic devices capable of executing machine-readable program instructions in accordance with an embodiment of the disclosure.

Data replicator 100, in an embodiment, may be executed each time a record is written to source data set 105. Data replicator 100 may access log 110 and write a replica of the record written to source data set 105 to target data set 115. Data replicator 100 may predict the location in target data set 115 where the replica record may be written, based on the data set characteristics and the access method being used to write the data records, for example predicting the RBA of the next record in a VSAM ESDS target data set 115. Data replicator 100 may utilize the source record's logged RBA from log 110 to compare with the predicted RBA write location in target data 115.

Figure 2:
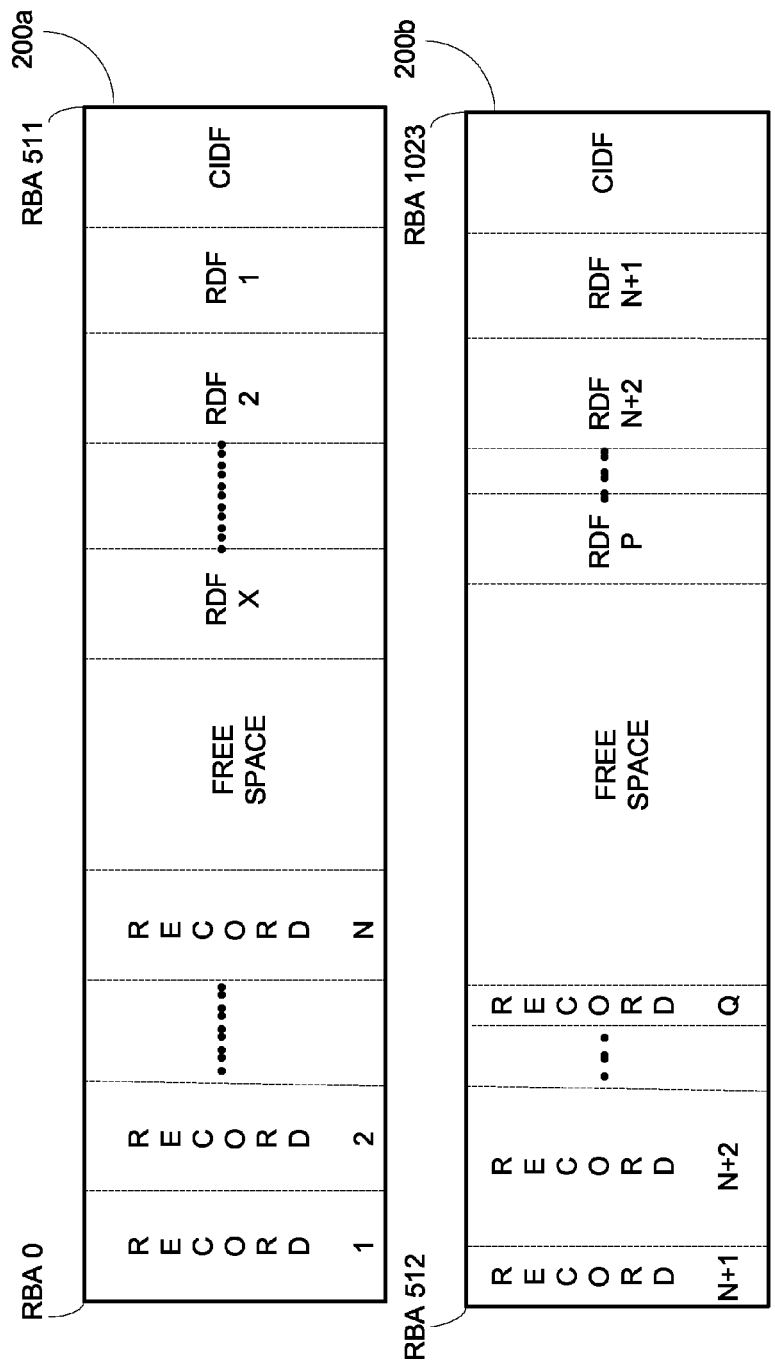
FIG. 2 is a diagram of exemplary control interval layouts of a VSAM ESDS, in accordance with an embodiment of the disclosure.

FIG. 2 is a diagram of exemplary control interval layouts of a VSAM ESDS, in accordance with an embodiment of the disclosure. All control intervals 200a, 200b, within the data portion of the data set are the same length. The exemplary control intervals 200a, 200b, are 512, bytes long. VSAM ESDS control interval 200a, includes record1, record2, . . . , recordn, free space, one or more record definition fields (RDF1, RDF2, . . . , RDFx) and a control interval definition field (CIDF). VSAM ESDS control interval 200b, includes recordn+1, recordn+2, . . . , recordq, free space, one or more record definition fields (RDFn+1, RDFn+2, . . . , RDFp) and a control interval definition field (CIDF). The number of RDFs in a control interval 200a, 200b, varies based on the records in the control interval 200a, 200b. Control intervals 200a, 220b, which include variable length records, where no two consecutive records are the same length, include one RDF per record in the control interval 200a, 200b. When there are two or more consecutive records of the same length in a control interval 200a, 200b, the consecutive, same length records are all described by two RDFs.

The CIDF, located in the last four bytes of control intervals 200a, and 200b, include the offset of the start of the free space in the respective control interval 200a, and 200b, and the number of bytes in the free space. Each CIDF is preceded by one or more three-byte RDFs which together describe the length of the all the records written in control intervals 200a, 200b. VSAM ESDS records are written sequentially from the beginning of control interval 200a, 200b, record1 having RBA 0, record2 having an RBA equal to the length of record1. Records are fully placed in a control interval 200a, 200b, and are written to the next control interval in sequence if they cannot fit in the free space of the current control interval 200a, 20f0b. Since VSAM ESDS records are written sequentially, once a record is written to a control interval 200a, 200b, the previous control intervals will no longer be written into even if the record being written would fit within the free space of a prior control interval. Spanned ESDS records that exist over multiple control intervals 200a, 200b, always start at the beginning of a control interval 200a, 200b, and any free space remaining in the prior control interval may not be used for another record, only to extend the spanned record.

Figure 3:
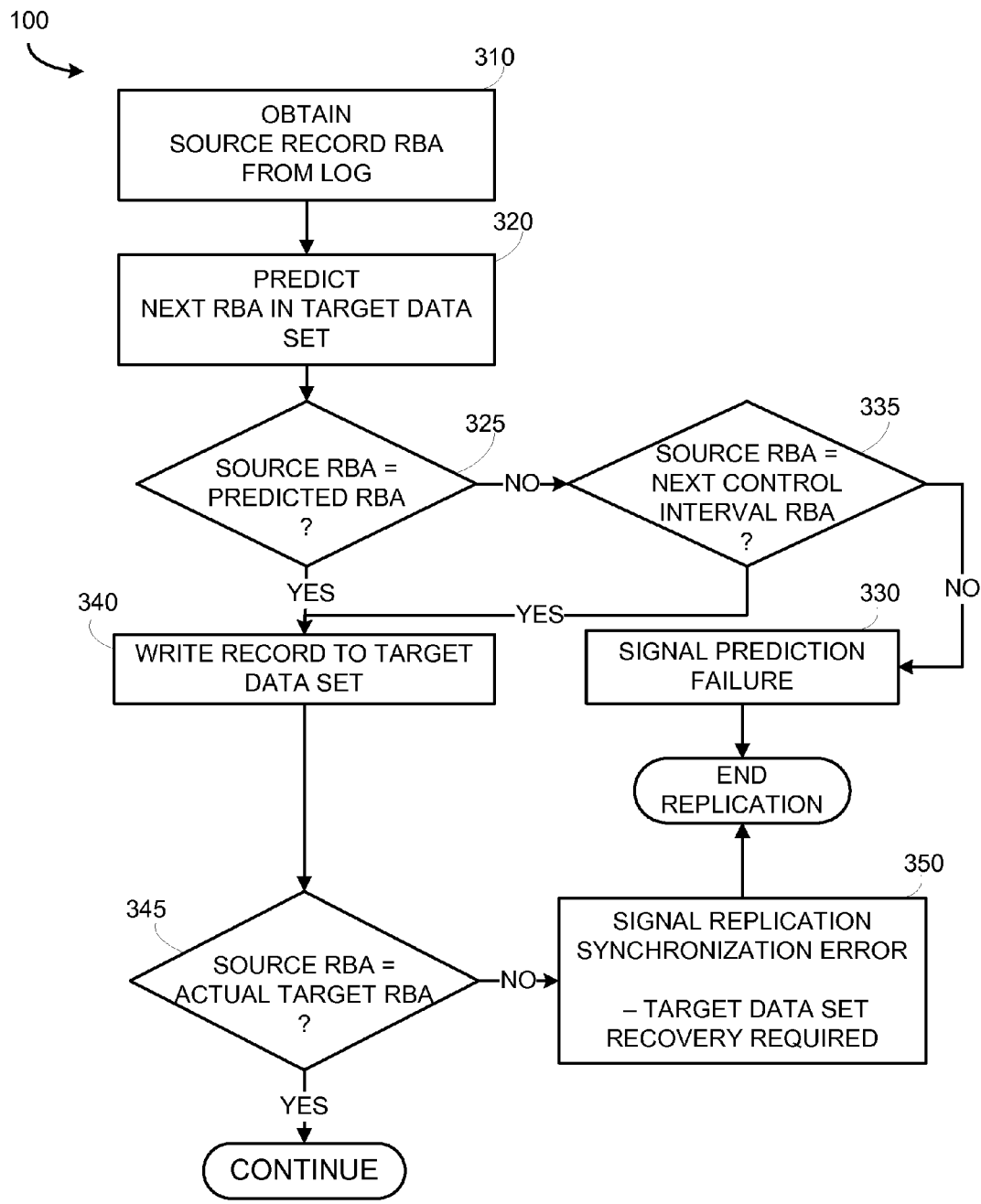
FIG. 3 is a flowchart illustrating the operation of data replicator routine, in accordance with an embodiment of the disclosure.

FIG. 3 is a flowchart illustrating the operation of data replicator 100, of the transaction processing system environment 199 of FIG. 1, utilizing VSAM ESDS source 105 and target 115 data sets, in accordance with an embodiment of the disclosure. When a data record, in a transaction processing system with replication is written to source data set 105, the source record may be logged in log 110. When data replicator 100 receives control to replicate the source record in target data set 115, data replicator 100 may access log 110, at 310, to obtain the location of the source record in source data set 105, for example the source record RBA, that was saved in log 110 when the source record was written.

In order to prevent corrupting target data set 115, data replicator 100 may predict, at 320, the location in target data set 115 where the replica record will be written, for example the next RBA in a VSAM ESDS. In certain embodiments, the next RBA may be predicted by determining the RBA and length of the prior record in target data set 115 and adding the prior record's length to its RBA. If no prior records have been written, the predicted next RBA is zero. In embodiments with VSAM ESDS, the prior record is the last record in target data set 115. For a Customer Information Control System (CICS) VSAM ESDS embodiment, the following CICS APIs may be used to obtain the RBA and length of the last record:

EXEC CICS STARTBR

EXEC CICS READPREV (parameter RIDFLD set to high-values (i.e. all bits set to 1))

EXEC CICS ENDBR

In certain other VSAM embodiments, VSAM access method services may be used to read the control interval 200a, 200b, and determine, from the CIDF, the offset from the beginning of the control interval 200a, 200b, to the free space in the control interval 200a, 200b. The next RBA may be predicted by determining the RBA of the control interval 200a, 200b, itself and adding the offset to the free space. Other data set formats and access methods may also be able to predict the relative position within the data set of the next record to be written.

After data replicator 100 predicts the location for the replica record, for example the next RBA in target data set 115, data replicator 100 may determine if the predicted location matches the source record location obtained at 310.

If the obtained source record location, for example the source record RBA, is identical to the predicted replica record RBA, as determined at 325, writing the replica record may not corrupt target data set 115 and data replicator 110 may, at 340, write the replica of the source record to target data set 115.

After the replica record is written to target data set 115, data replicator 100 may verify the replica record was written to the predicted location. For example, data replicator 100 may predict a valid RBA for the replica record, but before data replicator 100 actually writes the replica record, another software application writes a record to target data set 115, resulting in the replica record being written to an RBA different than the predicted RBA, and corruption of target data set 115. If the source record location obtained at 310, for example the source record RBA from log 110, is identical to the actual replica record location, for example the RBA returned from the VSAM ESDS write, as determined at 345, data replicator 100 successfully replicated the source record and execution of the transaction processing system 199 may continue. If the source record location obtained at 310, does not match the actual replica record location written in target data set 115, as determined at 345, data replicator 100 may signal the transaction processing system 199, at 350, a replication synchronization error occurred, indicating target data set 115 is corrupt and may need to be recovered. Replication for source data set 105 may end and the transaction encountering the synchronization error rolled back. Various other embodiments may compare the RBA returned from the VSAM ESDS write of the replica record with the RBA predicted at 320.

If the RBA location predicted at 320 for the replica record is not identical to the RBA location obtained for the source record from the log 110 at 310, as determined at 325, data replicator 100 may determine if the mis-match is due to the source record having been written into the next control interval 200a, 200b, (FIG. 2) in source data set 105. This may occur, for example, in VSAM ESDS if the free space in the control interval 200a, 200b, (FIG. 2) was not large enough to contain the entire source record. The predicted RBA for the next control interval may be determined by the following formula using the target RBA predicted at 320:

$$(\text{PREDICTED TARGET RBA}/\text{CONTROL INTERVAL SIZE}+1,)*\text{CONTROL INTERVAL SIZE}$$

The newly predicted target RBA will represent the first record in the next control interval 200a, 200b, (FIG. 2). Data replicator 100 may check again to verify the newly predicted replica record location is the proper location in the target data set 115. If the source RBA obtained at 310 is identical to the newly predicted next control interval RBA in target data set 115, as determined at 335, data replicator 100 may write the replica record to target data set 115, at 340.

In certain embodiments, an ESDS spanned record may be so large that the record is not in the next control interval, but rather in a later control interval. Those embodiments may need to consider additional control interval RBAs to compare against the source RBA obtained at 310.

If the newly predicted target RBA continues to mis-match the source record RBA obtained at 310, as determined at 335, data replicator 100 may signal the transaction processing system 199, at 330, that a pre-write prediction failure has occurred and target data set 115 may need to be recovered. Replication for source data set 105 may end and the transaction encountering the pre-write prediction error rolled back. For a source data set 105 and target data set 115 that were unsynchronized at the log reading position when replication began, target data set 115 may need to be recovered and rebuilt. For a prediction failure caused by an incorrect starting log reading position, the pre-write prediction failure signaled to the transaction processing system 199 may allow for a correction of the log reading position, and a restart of replication without rebuilding target data set 115.

FIG. 4 depicts a block diagram of components of the computing device 122 of the VSAM ESDS transaction processing system environment 199 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 122 can include one or more processors 420, one or more computer-readable RAMs 422, one or more computer-readable ROMs 424, one or more tangible storage devices 430, device drivers 440, read/write drive or interface 432, and network adapter or interface 436, all interconnected over a communications fabric 426. Communications fabric 426 can be implemented with any architecture designed for passing data and/or control information between processors (such as microprocessors, communications and network processors, etc.), system memory, peripheral devices, and any other hardware components within a system.

One or more operating systems 428, data replicators 100 (FIG. 1), source VSAM ESDS data sets 105 (FIG. 1), log of source records written 110 (FIG. 1), and target VSAM ESDS data sets 115 (FIG. 1) are stored on one or more of the computer-readable tangible storage devices 430 for execution by one or more of the processors 420 via one or more of the respective RAMs 422 (which typically include cache memory). In the illustrated embodiment, each of the computer-readable tangible storage devices 430 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 122 can also include a R/W drive or interface 432 to read from and write to one or more portable computer-readable tangible storage devices 470. Data replicator 100, source VSAM ESDS data sets 105 (FIG. 1), log of source records written 110 (FIG. 1), and target VSAM ESDS data sets 115 (FIG. 1) on computing device 122 can be stored on one or more of the portable computer-readable tangible storage devices 470, read via the respective R/W drive or interface 432, and loaded into the respective computer-readable tangible storage device 430.

Computing device 122 can also include a network adapter or interface 436, such as a TCP/IP adapter card or wireless communication adapter (such as a 4, G wireless communication adapter using OFDMA technology). Data replicator 100 on computing device 122 can be downloaded to the computing device from an external computer or external storage device via a network (for example, the Internet, a local area network or other, wide area network or wireless network) and network adapter or interface 436. From the network adapter or interface 436, the programs are loaded into the computer-readable tangible storage device 430. The network may comprise copper wires, optical fibers, wireless transmission, routers, firewalls, switches, gateway computers, and/or edge servers.

Computing device 122 can also include a display screen 450, a keyboard or keypad 460, and a computer mouse or touchpad 455. Device drivers 440 interface to display screen 450 for imaging, to keyboard or keypad 460, to computer mouse or touchpad 455, and/or to display screen 450 for pressure sensing of alphanumeric character entry and user selections. The device drivers 440, R/W drive or interface 432, and network adapter or interface 436 can comprise hardware and software (stored in computer-readable tangible storage device 430 and/or ROM 424).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for validating a write of a replica record to a replica data store in a transaction processing system, the replica record duplicating a source record in a source data store, the method comprising:
    writing, by the transaction processing system, the source record to a location in the source data store;
    obtaining, by the transaction processing system, the location of the source record in the source data store;
    predicting, by the transaction processing system, the location in the replica data store to which the replica record will be written, based on the location and length of the previous replica record;
    responsive to determining that the obtained location of the source record does not correspond to the predicted location of the replica record:
        not writing the replica record;
        signaling, to the transaction processing system, a replica record location prediction failure; and
        ending replication;
    responsive to determining that the obtained location of the source record corresponds to the predicted location of the replica record location, writing, by the transaction processing system, the replica record to a location in the replica data store; and
    responsive to determining that the obtained location of the source record does not correspond to the location in the replica data store to which the replica record was written, identifying the replica data store as corrupted.

2. The method according to claim 1, wherein the source data store and the replica data store are Virtual Storage Access Method (VSAM) Entry Sequenced Data Sets (ESDS).

3. The method according to claim 1, wherein each of the obtained location of the source record location, the predicted location of the replica record location, and the actual location to which the replica record will be written is a relative byte address (RBA).

4. The method according to claim 1, wherein the transaction processing system is a Customer Information Control System (CICS).

5. The method according to claim 2, wherein responsive to determining that the obtained location of the source record does not correspond to the predicted location of the replica record comprises:
    predicting, by the transaction processing system, a second location in a next control interval in the replica data store; and
    responsive to determining that the obtained location of the source record location does not correspond to the second predicted location:
        not writing the replica record;
        signaling, to the transaction processing system, a replica record location prediction failure; and
        ending replication.

6. A computer program product for validating a write of a replica record to a replica data store in a transaction processing system, the replica record duplicating a source record in a source data store, the computer program product comprising one or more computer-readable tangible non-transitory storage devices and program instructions stored on at least one of the one or more computer-readable tangible non-transitory storage devices, the program instructions comprising:

program instructions to write, by the transaction processing system, the source record to a location in the source data store;

program instructions to obtain, by the transaction processing system, the location of the source record in the source data store;

program instruction to predict, by the transaction processing system, the location in the replica data store to which the replica record will be written, based on the location and length of the previous replica record; and responsive to determining that the obtained location of the source record does not correspond to the predicted location of the replica record, program instructions to:
not write the replica record;
signal, to the transaction processing system, a replica record location prediction failure; and
end replication;

responsive to determining that the obtained location of the source record corresponds to the predicted location of the replica record location, program instructions to write, by the transaction processing system, the replica record to a location in the replica data store; and responsive to determining that the obtained location of the source record does not correspond to the location in the replica data store to which the replica record was written, program instructions to identify the replica data store as corrupted.

7. The computer program product according to claim 6, wherein each of the obtained location of the source record location, the predicted location of the replica record location, and the actual location to which the replica record will be written is a relative byte address (RBA).

8. The computer program product according to claim 6, wherein the transaction processing system is a Customer Information Control System (CICS).

9. The computer program product according to claim 6, wherein the source data store and the replica data store are Virtual Storage Access Method (VSAM) Entry Sequenced Data Sets (ESDS).

10. A computer system for validating a write of a replica record to a replica data store in a transaction processing system, the replica record duplicating a source record in a source data store, the computer system comprising one or more processors, one or more computer readable memories, one or more computer readable tangible storage devices, and program instructions stored on at least one of the one or more storage devices for execution by at least one of the one or more processors via at least one of the one or more memories, the program instructions comprising:

program instructions to write, by the transaction processing system, the source record to a location in the source data store;

program instructions to obtain, by the transaction processing system, the location of the source record in the source data store;

program instruction to predict, by the transaction processing system, the location in the replica data store to which the replica record will be written, based on the location and length of the previous replica record; and responsive to determining that the obtained location of the source record does not correspond to the predicted location of the replica record, program instructions to:
not write the replica record;
signal, to the transaction processing system, a replica record location prediction failure; and
end replication;

responsive to determining that the obtained location of the source record corresponds to the predicted location of the replica record location, program instructions to write, by the transaction processing system, the replica record to a location in the replica data store; and responsive to determining that the obtained location of the source record does not correspond to the location in the replica data store to which the replica record was written, program instructions to identify the replica data store as corrupted.

11. The computer system according to claim 10, wherein each of the obtained location of the source record location, the predicted location of the replica record location, and the actual location to which the replica record will be written is a relative byte address (RBA).

12. The computer program product according to claim 9, wherein responsive to determining that the obtained location of the source record does not correspond to the predicted location of the replica record comprises program instructions to:

predict, by the transaction processing system, a second location in a next control interval in the replica data store; and responsive to determining that the obtained location of the source record location does not correspond to the second predicted location:
not writing the replica record;
signaling, to the transaction processing system, a replica record location prediction failure; and
ending replication.

13. The computer system according to claim 10, wherein the source data store and the replica data store are Virtual Storage Access Method (VSAM) Entry Sequenced Data Sets (ESDS).

14. The computer system according to claim 13, wherein responsive to determining that the obtained location of the source record does not correspond to the predicted location of the replica record comprises program instructions to:

predict, by the transaction processing system, a second location in a next control interval in the replica data store; and responsive to determining that the obtained location of the source record location does not correspond to the second predicted location:
not writing the replica record;
signaling, to the transaction processing system, a replica record location prediction failure; and
ending replication.

* * * * *